United States Patent Office 3,544,593
Patented Dec. 1, 1970

3,544,593
SELENIUM COMPOUNDS
Ernst A. H. Friedheim, 5 Avenue Marc-Monnier,
Geneva, Switzerland
No Drawing. Filed Dec. 5, 1967, Ser. No. 688,010
Int. Cl. A61k 27/00; C07d 99/00
U.S. Cl. 260—327
14 Claims

ABSTRACT OF THE DISCLOSURE

New, therapeutically active selenium compounds are prepared by reacting a reactive selenium compound with an organic vicinal dithiol, in solution. For example, a dimercaptosuccinic acid compound is reacted with selenious acid in methylalcohol or ethanol in order to obtain a compound of the structural formula

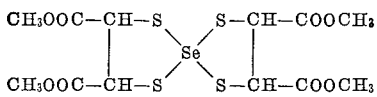

The new selenium compounds can be used for the treatment of seborrhea and other dermatological conditions by topical application.

---

This invention relates to therapeutically active organic compounds containing selenium in the molecule and has particular relation to compounds obtained by chemical reaction in the manner described hereinafter from selenium compounds and dithiols, e.g. dimercaptosuccinic acid compounds in a liquid reaction medium.

It has been previously suggested to react selenium compounds with monothiols, such as thioglycolic acid, thiolactic acid, and similar acids, glutathione, but the reaction products obtained with monothiols are of low stability and subject to decomposition and oxidation.

I have now found that reaction products of suitable selenium compounds with vicinal dithiols, as described hereinafter, results in stable compounds which are suitable for medical, e.g. topical, applications.

The products of the present invention are organic selenium compounds which contain in the molecule Se linked to sulfur atoms of vicinal dithiols and are characterized by the group

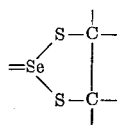

EXAMPLE 1

A solution of 12.9 g. of selenious acid (0.1 mol) dissolved in 100 ccm. of methanol is stirred, at a temperature not exceeding 40° C., with 42 g. (0.2 mol) of meso-dimercaptosuccinic acid dimethylester which is added in small portions over a period of 20 minutes. The reaction mixture is stirred and cooled to 15° C. for 2 hours. The yellow precipitate formed is then filtered off, washed with methyl alcohol and dried under vacuo. Its analysis is consistent with empyrical formula $Se(C_6H_8O_4S_2)_2$ and corresponds to the structural formula

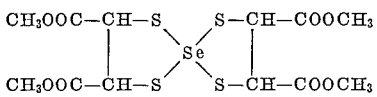

This compound is insoluble in water, methyl alcohol, ethyl alcohol, isopropylether, and soluble in benzylbenzoate, benzylalcohol, and chloroform. Upon boiling the compound in aqueous ammonia or sodium hydroxide, a red precipitate of selenium is formed.

EXAMPLE 2

The reaction described in the above Example 1 can be carried out also in water if the methanol is replaced by water. In this case, the reaction takes place substantially in the same manner as described in the above Example 1, except that stirring has to be continued for several hours until the reaction is terminated. This is indicated by the disappearance of the thiol reaction from methanol washings of a sample of the precipitate formed.

EXAMPLE 3

47.6 g. of meso-dimercaptosuccinic acid diethyl ester is added in small portions with stirring, at a temperature not exceeding 45° C. to a solution of 12.9 g. of selenious acid in 129 ccm. of ethanol. Stirring is continued for 1 hour. After standing at 10° C. for 2 hours the yellow precipitate formed is separated by filtration, washed with ethyl alcohol and dried in vacuo. It corresponds to the formula $$Se(C_8H_{12}O_4S_2)_2$$

This compound is insoluble in water, isopropylalcohol, propylene glycol, and soluble in chloroform.

Instead of the diethylester used as starting material in this example, other corresponding meso-dimercaptosuccinic acid esters, e.g. dibutyl-, dihexyl-, diisopropyl-, lauryl-, and/or stearyl esters can be used substantially in the same manner.

EXAMPLE 4

32 g. (0.2 mol) meso-dimercaptosuccinic acid and 12.9 g. (0.1 mol) of selenius acid are stirred at room temperature with 320 ml. of methanol. From the resulting yellow solution the compound corresponding to the formula

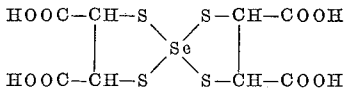

can be isolated by evaporation at low pressure and low temperature. Solutions in other lower alcohols can also be used.

By saturation of the reaction mixture with sodium acetate the corresponding sodium salt is obtained in form of a yellow-grey precipitate. The latter is filtered off, washed with methyl alcohol and dried in vacuo. The product thus obtained is insoluble in alcohol and soluble in water with a slight yellow color.

The sodium salt of the compound corresponding to the structural formula shown in this example is also obtainable by dissolving in water 2 mol of meso-dimercaptosuccinic acid and 1 mol of selenious acid and adjusting the pH with sodium hydroxide to substantially neutral reaction.

EXAMPLE 5

24.8 g. of 2,3-dimercaptopropanol dissolved in 120 ml. of methanol are added dropwise with rapid stirring to a solution of 12.9 g. of selenious acid in 120 ml. of methanol. A yellow precipitate is formed which is separated by filtration and washed with methanol until the washing fails to give a thiol reaction. The resulting product is dried in vacuo.

The yellow compound thus obtained corresponds to the following structural formula:

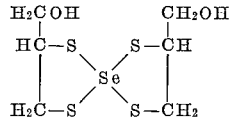

This product is a yellow compound, insoluble in water, methanol, ethanol, ethyl ether, and carbontetrachloride.

It is soluble in dimethylformamide. It is characterized by a rubber-like behavior in that the macroscopic parcels formed can be stretched to a multiple of their original length and then returned substantially to their original length. The compound gives an analysis consistent with the formula $Se(C_3H_6OS_2)_2$, but the physical behavior points to a polymer of this unit.

EXAMPLE 6

13.8 g. of 2,3-dimercaptopropionic acid dissolved in 70 ml. of ethanol are added to a solution of 12.9 g. of selenious acid dissolved in 70 ml. of ethanol. A yellow solution is thus obtained which contains an acid corresponding to the formula

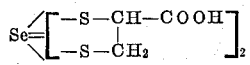

This acid may be isolated by evaporation to dryness of the alcoholic solution at low temperature and low pressure. The yellow residue is washed with isopropylether and dried in vacuo. It is soluble in aqueous alkali and precipitated from neutral or alkaline solutions by acidification with dilute hydrochloric acid.

It will be appreciated from the above examples that the process of the present invention is carried out in a liquid reaction medium which may be water or an organic solvent. The reaction proceeds at room temperature, e.g. 20° C. and up, with practical velocity. As the reaction of the invention is strongly exothermic, larger batches must be cooled so that the temperature does not exceed 40–45° C. At higher temperatures, e.g. up to 100° C., the reaction continues to take place but the reaction products have a tendency at these higher temperatures to gum up, probably with the formation of polymers.

As to the molar proportions of the reactants, the reaction between selenious acid and meso-dimercaptosumcinic acid dimethylester has been studied in this respect. Thereby, it has been found that proportions in the range between 1:1 and 1:3 give the same product, i.e. 2 dimercaptosuccinic acid methylesters for 1 selenium atom corresponding to the formula shown in the above Example 1. It is further significant that from the preparative angle it is advantageous to add the ester to the solution of the selenium compound, which would favor formation of a Se:dimercaptosuccinic acid ester ratio smaller than 1:2. Pouring the selenious acid into the ester solution, i.e. into an excess of ester, results in the formation of resinous compounds, probably polymers. While analytical observations on other thiols are not available at present, it seems logical to assume that the proportion of 2 dithio molecules for 1 Se is characteristic of this group.

According to the preferred embodiment of the invention as the selenium-containing reactant $H_2SeO_3$ has been used in the above Examples. Other compounds of Se, such as $SeO_2$, $SeCl_4$ and $SeOCl_2$ may also be used, but their use offers no advantages.

The compounds embodying the invention are useful in the treatment of seborrhea and other dermatological conditions by topical application, e.g. in lotions, shampoos, creams, ointments, suspensions and emulsions in organic, aqueous or mixed media. Such preparations or compositions are prepared from conventional ingredients and in conventional manner.

The products of the invention are distinguished by intensive activity in the treatment of abnormal skin conditions, e.g. seborrheic conditions and in the treatment of dandruff. They are stable products in solid condition and dissolved condition and of relatively low toxicity. Depending on the individual compound to be used and the disease for treatment of which they are used, they are effective, in small doses which are, particularly in the treatment of the human skin and scalp, as a rule not of harmful toxicity. They can be also administered in the form of sterile solutions by injection.

It will be understood from the above that this invention is not limited to the steps, conditions, materials and other details specifically described above and can be carried out in various modifications without departing from the scope of the invention as defined in the appended claims.

Thus, in the formula shown in the above Example 4 the H atoms of the carboxyl groups can be replaced by salt-forming atoms, such as Na, K, Li, $NH_4$, Ca, Mg, or organic groups such as mono- and dialkylamines, glucoseamine, N-methylglucamine, or alkyl, acyl and aryl radicals; furthermore, instead of vicinal dithiols of succinic acid, vicinal dithiols and homologous acids, such as for example glutaric acid or adipic acid can be used in carrying out the invention. I have further found that in contrast to other monothiol derivatives of selenium, the monothiol derivatives of thiomalic acid show relatively good stability and may be used for therapeutic purposes.

What is claimed is:

1. A process comprising the reaction by mixing under stirring the solution of a selenium compound containing in the molecule a reactive selenium atom and being selected from the group consisting of $H_2SeO_3$, $SeO_2$, $SeCl_4$, and $SeOCl_2$ with a solution of an organic dithiol selected from the group consisting of meso-dimercaptosuccinic acid compounds coresponding to the formula

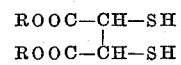

in which R stands for cations and radicals selected from the group consisting of H, Na, K, Li, $NH_4$, Ca, Mg, glucose amine, N-methyl-glucamine, and alkyl of up to 18 carbon atoms, and vicinal dithiols of glutaric acid and adipic acid, 2,3-dimercaptopropanol and 2,3-dimercaptopropionic acid, the solvent of acid solutions being selected from $CH_3OH$, $C_2H_5OH$ and water.

2. A process as claimed in claim 1, in which the organic dithiol is a dimercaptosuccinic acid compound and the selenium compound is selenious acid.

3. A process as claimed in claim 2, in which a methanol solution of meso-dimercaptosuccinic acid dimethylester is reacted with a methanol solution of selenious acid in molecular proportion of 2:1, under stirring at a temperature not exceeding 40° C.; thereby said dimethylester solution is added in small portions to said solution of selenious acid, under continued stirring.

4. A process as claimed in claim 3, in which the reaction is carried out in water and stirring is continued for several hours.

5. A process as claimed in claim 3, in which meso-dimercaptosuccinic acid diethylester is reacted in ethylalcohol at a temperature not exceeding 45° C. until the reaction is completed.

6. A process as claimed in claim 1, in which meso-dimercaptosuccinic acid is reacted under stirring with selenious acid in a molecular proportion of 2:1 at room temperature until the reaction is completed.

7. A process as claimed in claim 1, in which 2 mols of meso-dimercaptosuccinic acid and 1 mol of selenious acid are dissolved in water and the pH of the reaction mixture is adjusted with alkali hydroxide to neutral reaction.

8. A process as claimed in claim 1, in which a methanol solution of 2 mols of 2,3-dimercaptopropanol is reacted with 1 mol of selenious acid dissolved in methylalcohol or other lower aliphatic alcohol.

9. A process as claimed in claim 1, in which an ethanol solution of 2 mols of dimercaptopropionic acid is reacted with 1 mol of selenious acid dissolved in ethanol.

10. A compound corresponding to the structural formula

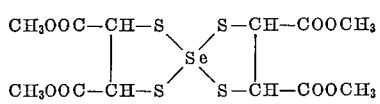

11. A compound corresponding to the structural formula

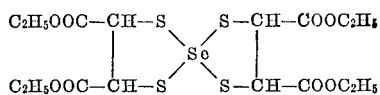

12. A compound corresponding to the structural formula

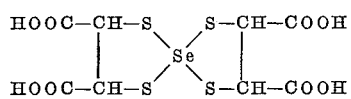

13. A compound corresponding to the structural formula

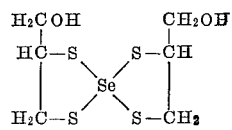

14. A compound corresponding to the structural formula

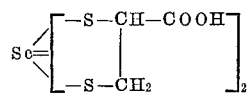

References Cited

Simon, et al., C.A., 55: 10302 (5–61).

HENRY R. JILES, Primary Examiner

C. H. SHURKO, Assistant Examiner

U.S. Cl. X.R.

424—275